(12) United States Patent
Yan et al.

(10) Patent No.: US 12,438,157 B2
(45) Date of Patent: Oct. 7, 2025

(54) IONIC CONDUCTOR SLURRY, PREPARATION METHOD THEREFOR AND APPLICATION THEREOF

(71) Applicant: TIANMULAKE EXCELLENT ANODE MATERIALS CO., LTD., Jiangsu (CN)

(72) Inventors: Zhao Yan, Jiangsu (CN); Fei Luo, Jiangsu (CN); Hong Li, Jiangsu (CN)

(73) Assignee: TIANMULAKE EXCELLENT ANODE MATERIALS CO., LTD., Jiangsu (CN)

( * ) Notice: Subject to any disclaimer, the term of this patent is extended or adjusted under 35 U.S.C. 154(b) by 680 days.

(21) Appl. No.: 17/593,782

(22) PCT Filed: Feb. 10, 2020

(86) PCT No.: PCT/CN2020/074655
§ 371 (c)(1),
(2) Date: Sep. 24, 2021

(87) PCT Pub. No.: WO2020/199755
PCT Pub. Date: Oct. 8, 2020

(65) Prior Publication Data
US 2022/0131153 A1 Apr. 28, 2022

(30) Foreign Application Priority Data
Mar. 29, 2019 (CN) .......................... 201910250707.0

(51) Int. Cl.
*H01M 4/62* (2006.01)
*H01M 10/0525* (2010.01)
*H01M 10/0562* (2010.01)

(52) U.S. Cl.
CPC .......... *H01M 4/624* (2013.01); *H01M 4/623* (2013.01); *H01M 10/0562* (2013.01); *H01M 10/0525* (2013.01); *H01M 2300/0071* (2013.01)

(58) Field of Classification Search
CPC .. H01M 4/624; H01M 4/623; H01M 10/0562; H01M 10/0525
See application file for complete search history.

(56) References Cited

U.S. PATENT DOCUMENTS 5,188,768 A * 2/1993 Sotomura .............. H01B 1/122
429/312
6,143,443 A * 11/2000 Kazacos ............... H01M 10/36
429/188
(Continued)

FOREIGN PATENT DOCUMENTS

CN 103682356 A 3/2014
CN 106207060 A 12/2016
(Continued)

OTHER PUBLICATIONS

English Machine Translation of CN 109148794 A (Year: 2019).*
(Continued)

*Primary Examiner* — Brian R Ohara
*Assistant Examiner* — Emily Elizabeth Freeman
(74) *Attorney, Agent, or Firm* — TraskBritt

(57) ABSTRACT

An ionic conductor slurry comprised parts by mass: 0.05 wt %-99.98 wt % of an ionic conductor powder material, 0 wt %-2 wt % of an anti-settling agent, 0 wt %-10 wt % of a binder, 0 wt %-2 wt % of dispersant, 0 wt %-2 wt % of an auxiliary agent, and 20 wt %-99.95 wt % of a solvent, wherein the ionic conductor powder material comprises one among the following: a garnet-type solid electrolyte material, a NASICON-type solid electrolyte material, a LISICON-type solid electrolyte material, a perovskite-type solid
(Continued)

electrolyte material, and derivatives thereof; The particle size of the ionic conductor powder is between 1 nm to 100 μm; and the ionic conductor slurry is used for separator coating material, positive electrode material coating materials, negative electrode material cladding materials, positive electrode material additive, a negative electrode material additive, polymer solid electrolyte additives, or solid-liquid mixed solid electrolyte.

9 Claims, 4 Drawing Sheets

(56) References Cited

U.S. PATENT DOCUMENTS

| | | | |
|---|---|---|---|
| 7,700,236 B2 | 4/2010 | Yang | |
| 2016/0020465 A1* | 1/2016 | Jeong | H01M 4/587 |
| | | | 556/467 |
| 2017/0207443 A1* | 7/2017 | Shen | H01M 4/131 |
| 2019/0027780 A1 | 1/2019 | Liu et al. | |
| 2019/0148765 A1* | 5/2019 | Otaki | H01M 10/446 |
| | | | 429/304 |
| 2021/0143436 A1* | 5/2021 | Yu | H01M 4/131 |
| 2021/0175487 A1* | 6/2021 | Iwane | H01M 4/623 |

FOREIGN PATENT DOCUMENTS

| | | | | |
|---|---|---|---|---|
| CN | 105097070 A | 5/2017 | | |
| CN | 106784609 A | 5/2017 | | |
| CN | 108598563 A | 9/2018 | | |
| CN | 109148794 A | * 1/2019 | ........ | H01M 10/0525 |
| CN | 109301314 A | 2/2019 | | |
| CN | 109478684 A | 3/2019 | | |
| CN | 109817871 A | 5/2019 | | |
| KR | 20150081412 A | 7/2015 | | |

OTHER PUBLICATIONS

Korea Office Action iMachine Translation Provided.
Chinese First Office Action in priority application No. 201910250707. 0; Office Action Date Mar. 13, 2020; Machine Translation Provided.
International Search Report in priority PCT application No. PCT/CN2020/074655; International Search Report Dated May 15, 2020.
Japan First Office Action in priority application No. 2021-557700; Office Action Date Nov. 22, 2022; Machine Translation Provided.
Chinese Rejection Decision for Chinese Application No. 201910250707. 0, dated Jan. 7, 2021, 5 pages of original documents only.
Chinese Second Office Action for Chinese Application No. 201910250707.0, dated Sep. 4, 2020, 13 pages with translation.
International Written Opinion for International Application No. PCT/CN2020/074655, mailed May 15, 2020, 9 pages. (5 pages of English Translation and 4 pages of Original Document).

* cited by examiner

IONIC CONDUCTOR SLURRY, PREPARATION METHOD THEREFOR AND APPLICATION THEREOF

CROSS-REFERENCE TO RELATED APPLICATION

This application claims priority to Chinese Patent Application No. 201910250707.0, filed with China National Intellectual Property Administration on Mar. 29, 2019, and entitled "IONIC CONDUCTOR SLURRY, PREPARATION METHOD THEREFOR AND APPLICATION THEREOF."

TECHNICAL FIELD

The present disclosure relates to the field of lithium battery material technologies, in particular, an ionic conductor slurry, preparation method thereof and application thereof.

BACKGROUND

At present, lithium-ion secondary batteries have been widely applied to portable electrical appliances such as mobile phones and notebook computers. As the technology develops, the lithium-ion batteries also have a very good application prospect in the fields of electric vehicles and energy storage, and surely will have a profound impact on people's life in the future.

With the broad application and rapid development of the lithium batteries, people have an increasingly high requirement for the performance of the lithium-ion batteries, requiring the lithium batteries not only to have a high capacity, but also to have a better capacity retention ratio during the repeated charging and discharging and to demonstrate excellent cycle performance with a long service life.

A slurry preparation process has a degree of impact on product quality being greater than 40% across the production process of the lithium-ion batteries, and is one of the most important processes in the whole production. However, for most of the current processes, the traditional slurry preparation manner is still used, where the slurry is dispersed with a high-speed dispersion process. The slurry prepared with this manner is easy to agglomerate and has disadvantages such as poor uniformity and stability, and long time for preparation process. The lithium-ion batteries prepared from such a slurry suffers from the problem of poor consistency, which affects the configuration and use of the lithium-ion batteries.

Therefore, there is an urgent need for a novel slurry and a method for preparing the same to overcome existing technical defects.

BRIEF SUMMARY

An object of the present disclosure is to provide an ionic conductor slurry, a preparation method and application thereof, for solving the problems existing in the prior art. The performance of the ionic conductor slurry is improved by increasing the quality of a slurry preparation process.

To achieve the object above, in a first aspect, the embodiments of the present disclosure provide an ionic conductor slurry, including, in parts by mass: 0.05 wt %-99.98 wt % of a material of ionic conductor powder, 0 wt %-2 wt % of an anti-settling agent, 0 wt %-10 wt % of a binder, 0 wt %-2 wt % of a dispersant, 0 wt %-2 wt % of an auxiliary, and 20 wt %-99.95 wt % of a solvent.

Wherein, the material of ionic conductor powder includes one of a material of garnet-type solid electrolyte, a material of NASICON-type solid electrolyte, a material of LISICON-type solid electrolyte, a material of perovskite-type solid electrolyte, and a derivative material thereof; a particle size of the ionic conductor powder ranges from 1 nm to 100 μm; and The ionic conductor slurry is applicable to a diaphragm coating material, an anode-material cladding material, a cathode-material cladding material, an anode-material additive, a cathode-material additive, an additive to polymer solid electrolyte, or a solid-liquid hybrid solid electrolyte.

Preferably, the garnet-type solid electrolyte is $Li_{7+m-n-3z}A1_zLa_{3-m}A4_mZr_{2-n}B4_nO_{12}$, wherein m, n and z are all in a range of [0-1], A4 is one or more of La, Ca, Sr, Ba, or K, and B4 is one or more of Ta, Nb, W, or a hafnium element Hf;

The LISICON-type solid electrolyte is $Li_{14}A1(B1O_4)_4$, wherein A1 is one or more of Zn, Zr, Cr, or Sn, and B1 is one or more of Ge, Si, S, or P;

The NASICON-type solid electrolyte is $Li_{1+x}A2_xB2_{2-x}(PO_4)_3$, wherein $0.01 \leq x \leq 0.5$, A2 is one or more of Al, Y, Ga, Cr, In, Fe, Se, or La, and B2 is one or more of Ti, Ge, Ta, Zr, Sn, Fe, V, or the hafnium element Hf; and The perovskite-type solid electrolyte is $Li_{3y}A3_{2/3-y}B3O_3$, wherein $0.01 \leq y \leq 2/3$, A3 is one or more of La, Al, Mg, Fe, or Ta, and B3 is one or more of Ti, Nb, Sr or Pr.

Preferably, the anti-settling agent includes one or more of polyamide wax, polyoxyethylene fatty alcohol amide, polyoxyethylene fatty alcohol amide, polyoxyethylene fatty alcohol sulphate, polyglycol ether or a titanate coupling agent.

Preferably, the binder includes one or more of polyvinylidene fluoride, carboxymethylcellulose, sodium carboxymethylcellulose, polymethyl methacrylate, polyacrylonitrile, butadiene styrene rubber, polyvinyl alcohol, polytetrafluoroethylene, polyolefins, fluorinated rubber, sodium alginate, polyacrylamide, polymethylmethacrylate-butyl acrylate, ethylene-vinyl copolymer, polyvinyl acetate, or polyurethane or gelatin.

Preferably, the dispersant includes one or more of sodium dodecyl benzene sulfonate, lauryl sodium sulfate, sodium hexametaphosphate, polyacrylic acid, cetyl trimethyl ammonium bromide, polyethylene glycol, polyvinylpyrrolidone, potassium polyacrylate, octylphenol polyoxyethylene ether, monoglyceride, glycerol tristearate, acyl oleate, or succinic acid.

Preferably, the auxiliary includes one or more of polydimethylsiloxane, silicone oil, polyethers, sodium alkyl polyoxyethylene ether carboxylate, polyoxyethylated alkylphenol ether, sodium alkyl benzene sulfonate, alkylphenol polyoxyethylene ether, polyoxyethylene alkyl amine, or polyoxyethylene amide.

Preferably, the solvent includes one or a mixture of more of deionized water, alcohol, N-methylpyrrolidone NMP, tetrahydrofuran, dimethylformamide DMF, or acetone.

In a second aspect, the embodiments of the present disclosure provide a method for preparing the ionic conductor slurry as defined in the first aspect above. The method includes:

Adding 0 wt %-10 wt % of the binder and 20 wt %-99.95 wt % of the solvent to a pre-stirring tank in desired proportions based on total mass parts of the desired ionic conductor slurry, and after the binder is completely dissolved, obtaining a uniform first slurry;

Adding 0.05 wt %-99.98 wt % of the material of ionic conductor powder to the first slurry in a desired proportion, adding 0 wt %-2 wt % of the anti-settling agent, and centrifuging at a centrifugal speed of 500 rpm-5000 rpm for 30 min to 1 h, wherein the material of ionic conductor powder includes one of the material of garnet-type solid electrolyte, the material of NASICON-type solid electrolyte, the material of LISICON-type solid electrolyte, the material of perovskite-type solid electrolyte, and the derivative material thereof, and the particle size of the ionic conductor powder ranges from 1 nm to 100 μm;

After centrifuging, adding a resultant to a sand mill to be sand milled for 30 min to 1 h;

After sand milling, taking out a resultant, into which 0 wt %-2 wt % of the dispersant and 0 wt %-2 wt % of the auxiliary are added, and stirring and dispersing to obtain a second slurry, wherein a stirring speed is 10 rpm-50 rpm, and a dispersing speed is 1000 rpm-5000 rpm; and Ultrasonically processing the second slurry at an ultrasonic frequency of 1-10 kHz for 30 min to 1 h to obtain the desired ionic conductor slurry.

Preferably, the garnet-type solid electrolyte is specifically $Li_{7+m-n-3z}A1_zLa_{3-m}A4_mZr_{2-n}B4_nO_{12}$, wherein m, n and z are all in a range of [0-1], A4 is one or more of La, Ca, Sr, Ba, or K, and B4 is one or more of Ta, Nb, W, or a hafnium element Hf;

The LISICON-type solid electrolyte is specifically $Li_{14}A1(B1O_4)_4$, wherein A1 is one or more of Zn, Zr, Cr, or Sn, and B1 is one or more of Ge, Si, S, or P;

The NASICON-type solid electrolyte is specifically $Li_{1+x}A2_xB2_{2-x}(PO_4)_3$, wherein $0.01 \leq x \leq 0.5$, A2 is one or more of A1, Y, Ga, Cr, In, Fe, Se, or La, and B2 is one or more of Ti, Ge, Ta, Zr, Sn, Fe, V, or the hafnium element Hf;

The perovskite-type solid electrolyte is specifically $Li_{3y}A3_{2/3-y}B3O_3$, wherein $0.01 \leq y \leq 2/3$, A3 is one or more of La, A1, Mg, Fe, or Ta, and B3 is one or more of Ti, Nb, Sr or Pr;

The anti-settling agent includes one or more of polyamide wax, polyoxyethylene fatty alcohol amide, polyoxyethylene fatty alcohol sulphate, polyglycol ether or a titanate coupling agent;

The binder includes one or more of polyvinylidene fluoride, carboxymethylcellulose, sodium carboxymethylcellulose, polymethyl methacrylate, polyacrylonitrile, butadiene styrene rubber, polyvinyl alcohol, polytetrafluoroethylene, polyolefins, fluorinated rubber, sodium alginate, polyacrylamide, polymethylmethacrylate-butyl acrylate, ethylene-vinyl copolymer, polyvinyl acetate, or polyurethane or gelatin;

The dispersant includes one or more of sodium dodecyl benzene sulfonate, lauryl sodium sulfate, sodium hexametaphosphate, polyacrylic acid, cetyl trimethyl ammonium bromide, polyethylene glycol, polyvinylpyrrolidone, potassium polyacrylate, octylphenol polyoxyethylene ether, monoglyceride, glycerol tristearate, acyl oleate, or succinic acid;

The auxiliary includes one or more of polydimethylsiloxane, silicone oil, polyethers, sodium alkyl polyoxyethylene ether carboxylate, polyoxyethylated alkylphenol ether, sodium alkyl benzene sulfonate, alkylphenol polyoxyethylene ether, polyoxyethylene alkyl amine, or polyoxyethylene amide; and The solvent includes one or a mixture of more of deionized water, alcohol, N-methylpyrrolidone NMP, tetrahydrofuran, dimethylformamide DMF, or acetone.

In a third aspect, the embodiments of the present disclosure provide a use of the ionic conductor slurry as defined in the first aspect above, wherein the ionic conductor slurry is applicable to an energy-storage device and a product containing the energy-storage device; and The energy-storage device includes one or more of a liquid lithium-ion battery, a metal lithium battery, a solid-liquid hybrid battery or an all-solid-state battery.

The ionic conductor slurry according to the present disclosure is improved in performance by increasing the quality of the slurry preparation process, and has a better cycle performance.

BRIEF DESCRIPTION OF THE DRAWINGS

The technical solutions of the embodiments of the present disclosure will be further described below in combination with the accompanying drawings and embodiments.

DETAILED DESCRIPTION

Figure 1:
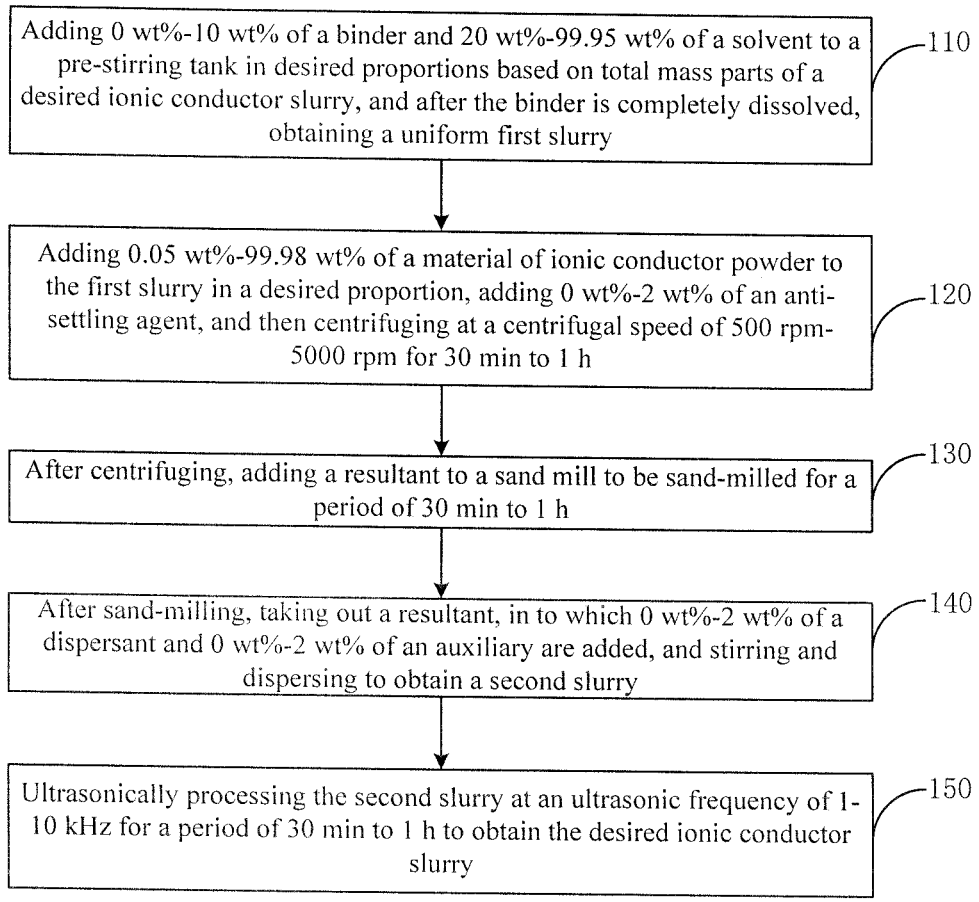
FIG. 1 illustrates a flowchart of a method for preparing an ionic conductor slurry according to an embodiment of the present disclosure.

The present disclosure will be further explained in detail below in combination with the embodiments, which yet is not intended to limit the protection scope of the present disclosure.

The embodiments of the present disclosure provide an ionic conductor slurry, which includes, in parts by mass, 0.05 wt %-99.98 wt % of a material of ionic conductor powder and 20 wt %-99.95 wt % of a solvent. In addition, the ionic conductor slurry may further include: not more than 2 wt % of an anti-settling agent, not more than 10 wt % of a binder, not more than 2 wt % of a dispersant, and not more than 2 wt % of an auxiliary, wherein one or several of the anti-settling agent, the binder, the dispersant and the auxiliary may be 0 as well.

Wherein, the material of ionic conductor powder includes one of a material of garnet-type solid electrolyte, a material of NASICON-type solid electrolyte, a material of LISICON-type solid electrolyte, a material of perovskite-type solid electrolyte, and a derivative material thereof; a particle size of the ionic conductor powder ranges from 1 nm to 100 μm;

The garnet-type solid electrolyte is specifically $Li_{7+m-n-3z}A1_zLa_{3-m}A4_mZr_{2-n}B4_nO_{12}$, wherein m, n and z are all in a range of [0-1], A4 is one or more of La, Ca, Sr, Ba, or K, and B4 is one or more of Ta, Nb, W, or a hafnium element Hf;

The LISICON-type solid electrolyte is specifically $Li_{14}A1(B1O_4)_4$, wherein A1 is one or more of Zn, Zr, Cr, or Sn, and B1 is one or more of Ge, Si, S, or P;

The NASICON-type solid electrolyte is specifically $Li_{1+x}A2_xB2_{2-x}(PO_4)_3$, wherein $0.01 \leq x \leq 0.5$, A2 is one or more of Al, Y, Ga, Cr, In, Fe, Se, or La, and B2 is one or more of Ti, Ge, Ta, Zr, Sn, Fe, V, or the hafnium element Hf; and The perovskite-type solid electrolyte is specifically $Li_{3y}A3_{2/3-y}B3O_3$, wherein $0.01 \leq y \leq 2/3$, A3 is one or more of La, Al, Mg, Fe, or Ta, and B3 is one or more of Ti, Nb, Sr or Pr.

The anti-settling agent includes one or more of polyamide wax, polyoxyethylene fatty alcohol amide, polyoxyethylene fatty alcohol sulphate, polyglycol ether or a titanate coupling agent.

The binder includes one or more of polyvinylidene fluoride, carboxymethylcellulose, sodium carboxymethylcellulose, polymethyl methacrylate, polyacrylonitrile, butadiene styrene rubber, polyvinyl alcohol, polytetrafluoroethylene, polyolefins, fluorinated rubber, sodium alginate, polyacrylamide, polymethylmethacrylate-butyl acrylate, ethylene-vinyl copolymer, polyvinyl acetate, or polyurethane or gelatin.

The dispersant includes one or more of sodium dodecyl benzene sulfonate, lauryl sodium sulfate, sodium hexametaphosphate, polyacrylic acid, cetyl trimethyl ammonium bromide, polyethylene glycol, polyvinylpyrrolidone, potassium polyacrylate, octylphenol polyoxyethylene ether, monoglyceride, glycerol tristearate, acyl oleate, or succinic acid.

The auxiliary includes one or more of polydimethylsiloxane, silicone oil, polyethers, sodium alkyl polyoxyethylene ether carboxylate, polyoxyethylated alkylphenol ether, sodium alkyl benzene sulfonate, alkylphenol polyoxyethylene ether, polyoxyethylene alkyl amine, or polyoxyethylene amide.

The solvent includes one or a mixture of more of deionized water, alcohol, N-methylpyrrolidone (NMP), tetrahydrofuran, dimethylformamide (DMF), or acetone.

A method for preparing the above-mentioned ionic conductor slurry according to the present disclosure includes, as shown by the flowchart in FIG. 1, the following steps:

In step 110, 0 wt %-10 wt % of the binder and 20 wt %-99.95 wt % of the solvent are added to a pre-stirring tank in desired proportions based on total mass parts of the desired ionic conductor slurry, and after the binder is completely dissolved, a uniform first slurry is obtained;

In Step 120, 0.05 wt %-99.98 wt % of the material of ionic conductor powder is added to the first slurry in a desired proportion; 0 wt %-2 wt % of the anti-settling agent is added; and then a resultant is centrifuged at a centrifugal speed of 500 rpm-5000 rpm for 30 min to 1 h;

In step 130, after centrifuging, a resultant is added to a sand mill to be sand milled for 30 min to 1 h;

In step 140, after sand milling, a result is taken out, into which 0 wt %-2 wt % of the dispersant and 0 wt %-2 wt % of the auxiliary are added, and stirring and dispersing are performed to obtain a second slurry.

Wherein, a stirring speed is 10 rpm-50 rpm, and a dispersing speed is 1000 rpm-5000 rpm; and In Step 150, the second slurry is ultrasonically processed at an ultrasonic frequency of 1-10 kHz for 30 min to 1 h to obtain the desired ionic conductor slurry.

The materials mentioned in each step of the method described above have been explained previously, which will not be repeated here anymore.

The ionic conductor slurry prepared according to the present disclosure is applicable to a diaphragm coating material, an anode-material cladding material, a cathode-material cladding material, an anode-material additive, a cathode-material additive, an additive to polymer solid electrolyte, or a solid-liquid hybrid solid electrolyte; and specifically, it is applicable to an energy-stage device and a product containing the energy-storage device. The energy-storage device may include: a liquid lithium-ion battery, a metal lithium battery, a solid-liquid hybrid battery, semisolid battery or an all-solid-state battery.

The ionic conductor slurry according to the present disclosure is improved in performance by increasing the quality of the slurry preparation process, and has a better cycle performance compared with the existing commercial ionic conductor slurry.

The technical solutions of the present disclosure will be further explained in detail below with reference to specific examples.

Embodiment 1

This embodiment provides a preparation method for an ionic conductor slurry and performance test results.

1 Kg of ionic conductor powder $Li_{1.5}Al_{0.5}Ti_{1.5}(PO_4)_3$ was added to 100 L of deionized water, and centrifuged for 30 min at a centrifugal speed of 1000 rpm; then upper slurry was added to a sand mill to be sand milled for 1 h, and ultrasonically processed at an ultrasonic frequency of 3000 Hz for 1 h; and the ionic conductor slurry was obtained.

The ionic conductor slurry prepared above together with commercial lithium cobaltate was mixed, dried and sintered to obtain a coated-modified lithium cobalt material of Embodiment 1.

The coated-modified lithium cobaltate material, together with the commercial lithium cobaltate material that was not coated and modified by the ionic conductor slurry, was mixed respectively with polyvinylidene fluoride (PVDF) as a binder and conductive carbon black (SP) as a conductive additive, to prepare pole pieces, respectively.

Figure 2:
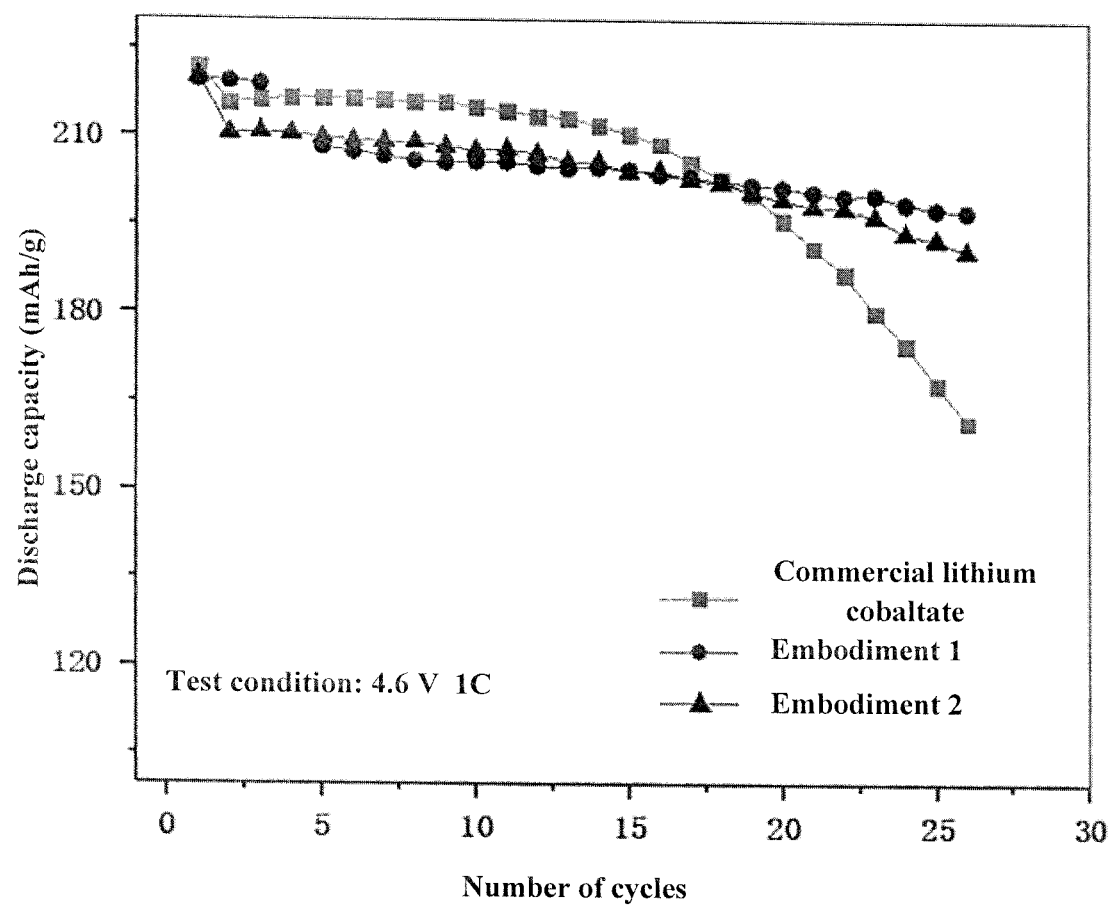
FIG. 2 illustrates a first comparison diagram of a half-battery cycle performance test according to an embodiment of the present disclosure.

The two pole pieces were each prepared into a half-battery by using metal lithium as a counter electrode, and then tests were performed for comparison. Within the preparation range of 2.7-4.6 v, the electrochemical performance of the coated-modified lithium cobaltate material and the electrochemical performance of the commercial lithium cobaltate were tested at a 1 C rate and compared as shown in FIG. 2. It can be seen from that after 20 cycles, the discharge capacity of the existing commercial lithium cobaltate decreases quickly, and the discharge capacity of the coated-modified lithium cobaltate material according to the present disclosure can still be maintained over 180 mAh/g, showing a cycle performance far superior to that of the existing commercial lithium cobaltate material.

Embodiment 2

This embodiment provides a method preparation for an ionic conductor slurry and performance test results.

1 Kg of ionic conductor powder $LiAl_{1/3}TiO_3$ was added to 30 L of a N-methylpyrrolidone solvent, and centrifuged for 30 min at a centrifugal speed of 1000 rpm; then upper slurry was added to a sand mill to be sand milled for 30 min, and ultrasonically processed at an ultrasonic frequency of 3000 Hz for 30 min; and then the ionic conductor slurry was obtained.

The ionic conductor slurry prepared above together with commercial lithium cobaltate was mixed, dried and sintered to obtain the coated-modified lithium cobalt material of Embodiment 2.

The coated-modified lithium cobaltate material was mixed with polyvinylidene fluoride (PVDF) as a binder and conductive carbon black (SP) as a conductive additive according to the method described above, to prepare pole pieces, respectively.

Similarly, metal lithium was used as a counter electrode to prepare a half battery to be tested and compared. Within the preparation range of 2.7-4.6 v, the electrochemical performance of the coated-modified lithium cobaltate material tested at a 1 C rate was also illustrated in FIG. 2. It can be seen from that after 20 cycles, the discharge capacity of the existing commercial lithium cobaltate decreases quickly, and the discharge capacity of the coated-modified lithium cobaltate material according to the present disclosure can still be maintained above 180 mAh/g, showing a cycle performance is more advantageous than that of the existing commercial lithium cobaltate material.

From the comparison above, it can be seen from that the materials coated and modified by the ionic conductor slurry according to Embodiment 1 and Embodiment 2 have a more excellent cycle performance.

Figure 3:
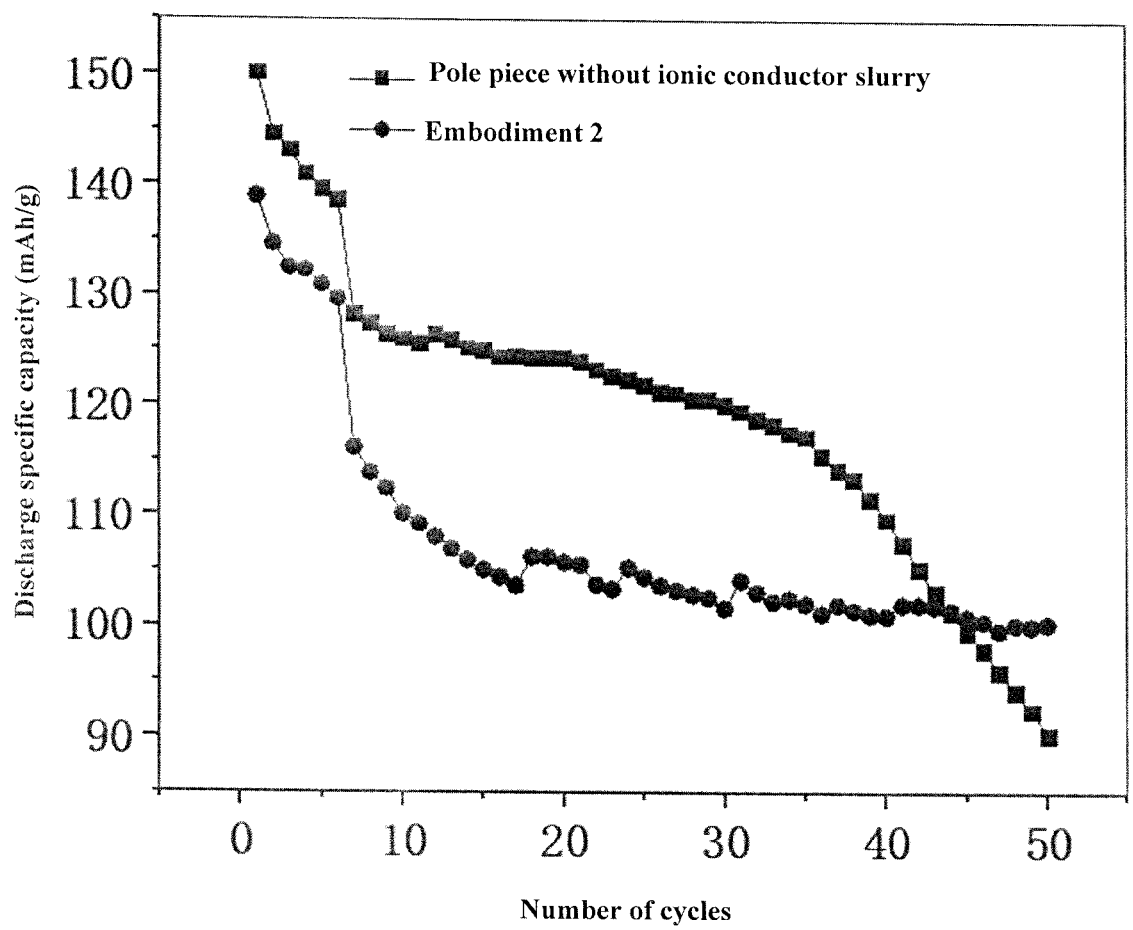
FIG. 3 illustrates a second comparison diagram of the half-battery cycle performance test according to an embodiment of the present disclosure.

In addition, the test was performed at a 1 C rate with 4.2 V at the temperature of 45° C. Pole pieces prepared from the coated-modified lithium cobaltate material in this embodiment and the commercial lithium cobaltate material, that was not coated and modified by the ionic conductor slurry, were assembled into half batteries according to the method described above for the comparison test, as illustrated in FIG. 3. The material coated and modified by the ionic conductor slurry according to the present disclosure had a more excellent cycle performance.

Embodiment 3

This embodiment provides a preparation method for an ionic conductor slurry.

1 kg of ionic conductor powder $Li_7La_3Zr_2O_{12}$ was added to 50 L of an alcohol solvent, and centrifuged for 30 min at a centrifugal speed of 1000 rpm; then upper slurry was added to a sand mill to be sand milled for 1 h, and then milled for another 1 h under ultrasonic processing at an ultrasonic frequency of 3000 Hz; and the ionic conductor slurry was obtained.

Embodiment 4

This embodiment provides a preparation method for an ionic conductor slurry and performance test results.

200 g of polyvinylidene fluoride as a binder was added to 5.2 kg of a N-methylpyrrolidone solvent, and was stirred until full dissolution; subsequently, 1 kg of ionic conductor powder $Li_{14}Zr(PO_4)_4$ was slowly added, and centrifuged for 30 min at a centrifugal speed of 1000 rpm; then upper slurry was added to a sand mill to be sand milled for 30 min, and then milled for another 30 min under ultrasonic processing at an ultrasonic frequency of 3000 Hz; and the ionic conductor slurry was obtained.

Figure 4:
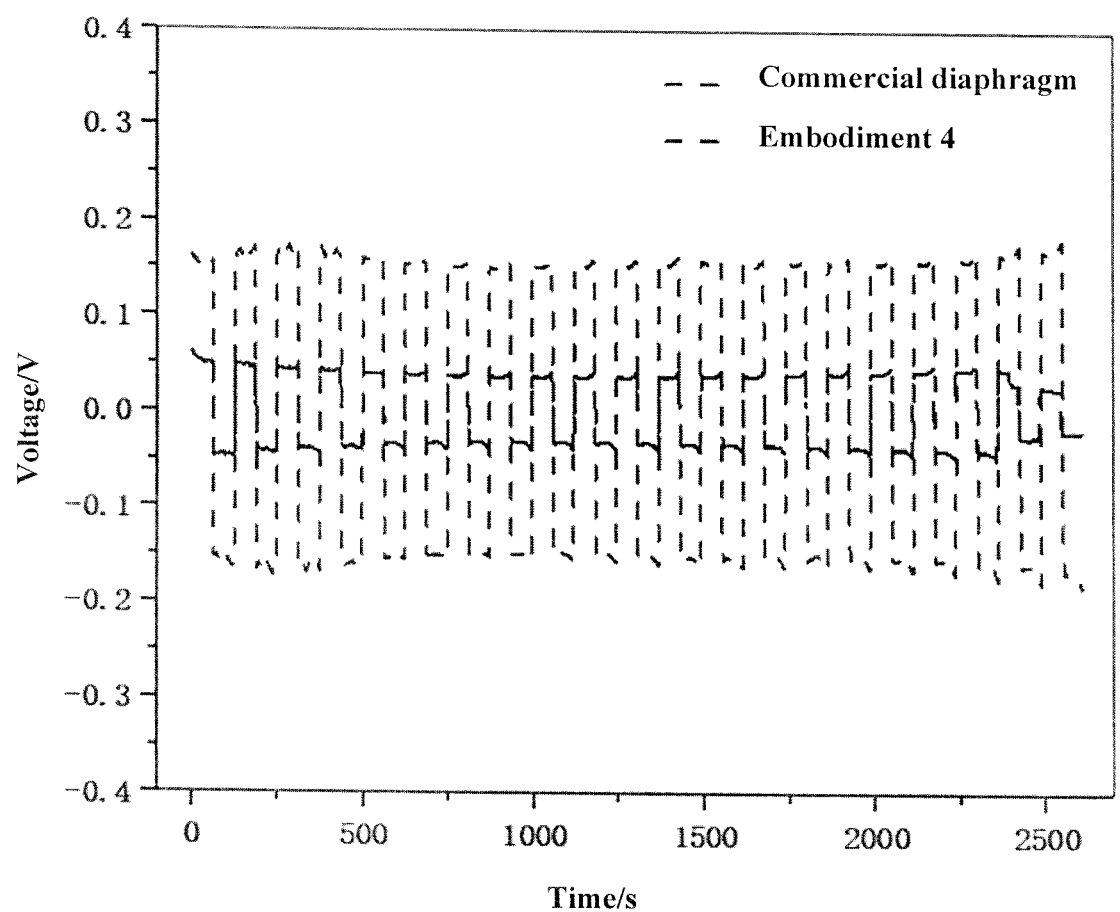
FIG. 4 illustrates an electrochemical performance diagram according to an embodiment of the present disclosure.

The ionic conductor slurry described above was coated on the surface of a diaphragm, from which a lithium-on-lithium button battery was then assembled; and a cycle test was performed at a current density of 3 mA/cm². To compare the performance, an uncoated commercial diaphragm was assembled in the same way and then tested and compared, as illustrated in FIG. 4. It can be seen from that the material according to this embodiment is lower in DC internal resistance.

Embodiment 5

This embodiment provides a preparation method for an ionic conductor slurry.

300 g of polyacrylonitrile as a binder was added to 5 kg of dimethyl formamide (DMF) and stirred until full dissolution; subsequently, 1 kg of ionic conductor powder $Li_2TiO_3$ was slowly added; centrifuging was performed at a centrifugal speed of 1000 rpm for 30 min; a resulting mixed slurry was added to the sand mill to be sand milled for 1 h; after the sand milling was completed, 50 g of polyvinylpyrrolidone as a dispersant and 15 g of polyoxyethylated alkylphenol as an auxiliary were added; a resultant was placed into a beating machine and stirred for 1 h at a stirring speed of 20 rpm and a dispersing speed of 3000 rpm; and then, milling was performed for 30 min under ultrasonic processing at an ultrasonic frequency of 3000 Hz to obtain the ionic conductor slurry.

As illustrated in the diagrams of comparison tests described above, it can be seen from that the ionic conductor slurry according to the present disclosure is improved in quality and performance by increasing the slurry preparation process. The ionic conductor slurry is applicable to energy-storage devices such as liquid lithium-ion batteries, metal lithium batteries, solid-liquid hybrid batteries, semi-solid-state batteries or all-solid-state batteries, and product pools containing the energy-storage devices. The ionic conductor slurry has a better cycle performance.

The objects, technical solutions and advantageous effects of the present disclosure are further illustrated in detail with the specific embodiments described above. It should be understood that the description above only involves the specific embodiments of the present disclosure and is not intended to limit the protection scope of the present disclosure. Any modifications, equivalent substitutions, improvements and the like made within the spirit and principle of the present disclosure shall be construed as being included within the protection scope of the present disclosure.

What is claimed is:

1. An ionic conductor slurry, comprising, in parts by mass: 0.05 wt %-99.98 wt % of a material of ionic conductor powder, 0.05 wt %-2 wt % of an anti-settling agent, 0 wt %-10 wt % of a binder, 0 wt %-2 wt % of a dispersant, 0 wt %-2 wt % of an auxiliary, and 20 wt %-99.95 wt % of a solvent, wherein the material of ionic conductor powder comprises one of a material of garnet-type solid electrolyte, a material of NASICON-type solid electrolyte, a material of LISICON-type solid electrolyte, a material of perovskite-type solid electrolyte, and a derivative material thereof; a particle size of the ionic conductor powder ranges from 1 nm to 100 μm; wherein the anti-settling agent is polyamide wax, polyoxyethylene fatty alcohol amide, or polyoxyethylene fatty alcohol sulphate; and the ionic conductor slurry is applicable to an anode-material cladding material, a cathode-material cladding material, an anode-material additive, a cathode-material additive, an additive to polymer solid electrolyte, or a solid-liquid hybrid solid electrolyte.

2. The ionic conductor slurry according to claim 1, wherein:

the garnet-type solid electrolyte is $Li_{7+m-n-3z}Al_zLa_{3-m}A4_mZr_{2-n}B4_nO_{12}$, wherein m, n and z are all in a range of [0-1], A4 is one or more of La, Ca, Sr, Ba, or K, and B4 is one or more of Ta, Nb, W, or a hafnium element Hf;

the LISICON-type solid electrolyte is $Li_{14}A1(B1O_4)_4$, wherein A1 is one or more of Zn, Zr, Cr, or Sn, and B1 is one or more of Ge, Si, S, or P;

the NASICON-type solid electrolyte is $Li_{1+x}A2_xB2_{2-x}(PO_4)_3$, wherein $0.01 \leq x \leq 0.5$, A2 is one or more of Al, Y, Ga, Cr, In, Fe, Se, or La, and B2 is one or more of Ti, Ge, Ta, Zr, Sn, Fe, V, or the hafnium element Hf; and the perovskite-type solid electrolyte is $Li_{3y}A3_{2/3-y}B3O_3$, wherein $0.01 \leq y \leq 2/3$, A3 is one or more of La, Al, Mg, Fe, or Ta, and B3 is one or more of Ti, Nb, Sr or Pr.

3. The ionic conductor slurry according to claim 1, wherein the binder comprises one or more of polyvinylidene fluoride, carboxymethylcellulose, sodium carboxymethylcellulose, polymethyl methacrylate, polyacrylonitrile, butadiene styrene rubber, polyvinyl alcohol, polytetrafluoroethylene, polyolefins, fluorinated rubber, sodium alginate, polyacrylamide, polymethylmethacrylate-butyl acrylate, ethylene-vinyl copolymer, polyvinyl acetate, polyurethane, or gelatin.

4. The ionic conductor slurry according to claim 1, wherein the dispersant comprises one or more of sodium dodecyl benzene sulfonate, lauryl sodium sulfate, sodium hexametaphosphate, polyacrylic acid, cetyl trimethyl ammonium bromide, polyethylene glycol, polyvinylpyrrolidone, potassium polyacrylate, octylphenol polyoxyethylene ether, monoglyceride, glycerol tristearate, acyl oleate, or succinic acid.

5. The ionic conductor slurry according to claim 1, wherein the auxiliary comprises one or more of polydimethylsiloxane, polyethers, sodium alkyl polyoxyethylene ether carboxylate, polyoxyethylated alkylphenol ether, sodium alkyl benzene sulfonate, alkylphenol polyoxyethylene ether, polyoxyethylene alkyl amine, or polyoxyethylene amide.

6. The ionic conductor slurry according to claim 1, wherein the solvent comprises one or a mixture of more than one of deionized water, alcohol, N-methylpyrrolidone NMP, tetrahydrofuran, dimethylformamide DMF, or acetone.

7. A preparation method for the ionic conductor slurry according to claim 1, comprising:
adding 0 wt %-10 wt % of the binder and 20 wt %-99.95 wt % of the solvent to a pre-stirring tank in desired proportions based on total mass parts of the desired ionic conductor slurry, and after the binder is completely dissolved, obtaining a uniform first slurry;
adding 0.05 wt %-99.98 wt % of the material of ionic conductor powder to the first slurry in a desired proportion, adding not more than 2 wt % of the anti-settling agent, and centrifuging at a centrifugal speed of 500 rpm-5000 rpm for 30 min to 1 h, wherein the material of ionic conductor powder comprises one of the material of garnet-type solid electrolyte, the material of NASICON-type solid electrolyte, the material of LISICON-type solid electrolyte, the material of perovskite-type solid electrolyte, and the derivative material thereof, and the particle size of the ionic conductor powder ranges from 1 nm to 100 μm; wherein the anti-settling agent is polyamide wax, polyoxyethylene fatty alcohol amide, or polyoxyethylene fatty alcohol sulphate;
after centrifuging, adding a resultant to a sand mill to be sand milled for 30 min to 1 h;
after sand milling, taking out a resultant, into which 0 wt %-2 wt % of the dispersant and 0 wt %-2 wt % of the auxiliary are added, and stirring and dispersing to obtain a second slurry, wherein a stirring speed is 10 rpm-50 rpm, and a dispersing speed is 1000 rpm-5000 rpm; and
ultrasonically processing the second slurry at an ultrasonic frequency of 1 kHz-10 kHz for 30 min to 1 h to obtain the desired ionic conductor slurry;
wherein the ionic conductor slurry is applicable to an anode-material cladding material, a cathode-material cladding material, an anode-material additive, a cathode-material additive, an additive to polymer solid electrolyte, or a solid-liquid hybrid solid electrolyte.

8. The preparation method for the ionic conductor slurry according to claim 7, wherein the garnet-type solid electrolyte is $Li_{7+m-n-3z}Al_zLa_{3-m}A4_mZr_{2-n}B4_nO_{12}$, wherein m, n and z are all in a range of [0-1], A4 is one or more of La, Ca, Sr, Ba, or K, and B4 is one or more of Ta, Nb, W, or a hafnium element Hf;

the LISICON-type solid electrolyte is $Li_{14}Al(B1O_4)_4$, wherein A1 is one or more of Zn, Zr, Cr, or Sn, and B1 is one or more of Ge, Si, S, or P;

the NASICON-type solid electrolyte is $Li_{1+x}A2_xB2_{2-x}(PO_4)_3$, wherein $0.01 \leq x \leq 0.5$, A2 is one or more of Al, Y, Ga, Cr, In, Fe, Se, or La, and B2 is one or more of Ti, Ge, Ta, Zr, Sn, Fe, V, or the hafnium element Hf;

the perovskite-type solid electrolyte is $Li_{3y}A3_{2/3-y}B3O_3$, wherein $0.01 \leq y \leq 2/3$, A3 is one or more of La, Al, Mg, Fe, or Ta, and B3 is one or more of Ti, Nb, Sr or Pr;

the binder comprises one or more of polyvinylidene fluoride, carboxymethylcellulose, sodium carboxymethylcellulose, polymethyl methacrylate, polyacrylonitrile, butadiene styrene rubber, polyvinyl alcohol, polytetrafluoroethylene, polyolefins, fluorinated rubber, sodium alginate, polyacrylamide, polymethylmethacrylate-butyl acrylate, ethylene-vinyl copolymer, polyvinyl acetate, polyurethane, or gelatin;

the dispersant comprises one or more of sodium dodecyl benzene sulfonate, lauryl sodium sulfate, sodium hexametaphosphate, polyacrylic acid, cetyl trimethyl ammonium bromide, polyethylene glycol, polyvinylpyrrolidone, potassium polyacrylate, octylphenol polyoxyethylene ether, monoglyceride, glycerol tristearate, acyl oleate, or succinic acid;

the auxiliary comprises one or more of polydimethylsiloxane, polyethers, sodium alkyl polyoxyethylene ether carboxylate, polyoxyethylated alkylphenol ether, sodium alkyl benzene sulfonate, alkylphenol polyoxyethylene ether, polyoxyethylene alkyl amine, or polyoxyethylene amide; and the solvent comprises one or a mixture of more than one of deionized water, alcohol, N-methylpyrrolidone NMP, tetrahydrofuran, dimethylformamide DMF, or acetone.

9. An application of the ionic conductor slurry according to claim 1, wherein the ionic conductor slurry is applicable to an energy-storage device and a product containing the energy-storage device; and the energy-storage device comprises one or more of a liquid lithium-ion battery, a metal lithium battery, a solid-liquid hybrid battery, a semisolid battery, or an all-solid-state battery.

* * * * *